(12) United States Patent
Klatt et al.

(10) Patent No.: US 10,495,048 B2
(45) Date of Patent: Dec. 3, 2019

(54) HANDHELD WORK APPARATUS HAVING A COMBUSTION ENGINE

(71) Applicant: Andreas Stihl AG & Co. KG, Waiblingen (DE)

(72) Inventors: Clemens Klatt, Berglen (DE); Michael Unterkircher, Uhingen (DE)

(73) Assignee: Andreas Stihl AG & Co. KG, Waiblingen (DE)

(*) Notice: Subject to any disclaimer, the term of this patent is extended or adjusted under 35 U.S.C. 154(b) by 0 days.

(21) Appl. No.: 16/132,442

(22) Filed: Sep. 16, 2018

(65) Prior Publication Data

US 2019/0085812 A1    Mar. 21, 2019

(30) Foreign Application Priority Data

Sep. 15, 2017 (DE) .......... 10 2017 008 756

(51) Int. Cl.
*F02P 5/14* (2006.01)
*F02D 35/02* (2006.01)
*F02D 41/22* (2006.01)
*F02P 5/02* (2006.01)
*F02P 5/04* (2006.01)

(52) U.S. Cl.
CPC .............. *F02P 5/14* (2013.01); *F02D 35/02* (2013.01); *F02D 41/22* (2013.01); *F02P 5/02* (2013.01); *F02P 5/045* (2013.01); *F02D 2200/021* (2013.01); *F02D 2400/06* (2013.01)

(58) Field of Classification Search
CPC ...... F02P 5/14; F02P 5/02; F02P 5/045; F02D 35/02; F02D 41/22; F02D 2200/021; F02D 2400/06
See application file for complete search history.

(56) References Cited

U.S. PATENT DOCUMENTS

2019/0237829 A1* 8/2019 Lo .................. H01M 2/1077

* cited by examiner

*Primary Examiner* — Hieu T Vo
(74) *Attorney, Agent, or Firm* — Walter Ottesen, P.A.

(57) ABSTRACT

A handheld work apparatus has a combustion engine and an ignition device for controlling a spark plug. The ignition device includes an electronic control device having a short circuit button for switching off the combustion engine. A temperature sensor is for capturing an operating temperature. The short circuit button and the temperature sensor are connected to a common signal input of the control device via a common signal line. The temperature sensor is an ohmic resistance variable on the basis of the temperature. A measurement voltage dropped across the resistance of the temperature sensor is supplied, as an analog temperature signal, to a common analog signal input of the control device. The measurement voltage at the temperature sensor collapses in the button position of the short circuit button, as a result of which the analog temperature signal applied to the analog signal input of the control device is extinguished.

10 Claims, 2 Drawing Sheets

HANDHELD WORK APPARATUS HAVING A COMBUSTION ENGINE

CROSS REFERENCE TO RELATED APPLICATION

This application claims priority of German patent application no. 10 2017 008 756.3, filed Sep. 15, 2017, the entire content of which is incorporated herein by reference.

FIELD OF THE INVENTION

The invention relates to a handheld work apparatus having a spark-ignition combustion engine arranged in a motor housing and an ignition device for controlling a spark plug which ignites a mixture drawn into a combustion chamber of the combustion engine. The ignition device includes an electronic control device and a short circuit button with a button position for switching off the combustion engine. A first temperature sensor for capturing an operating temperature is also provided. The short circuit button and the first temperature sensor are connected to a common signal input of the control device via a common signal line.

SUMMARY OF THE INVENTION

It is an object to connect an analog temperature sensor to a signal line of a short circuit button in an operationally reliable manner with little effort.

The aforementioned object can, for example, be achieved, by virtue of a first temperature sensor being an ohmic resistance which is variable on the basis of the temperature, wherein the measurement voltage dropped across the resistance of the first temperature sensor is supplied, as an analog temperature signal, to an analog signal input of the control device. The analog signal input is a common signal input for the short circuit button and the first temperature sensor. The electrical connection of the resistance of the first temperature sensor is provided in such a manner that the measurement voltage at the first temperature sensor collapses in the button position of the short circuit button, as a result of which the analog temperature signal is extinguished when the short circuit button is actuated.

If the short circuit button is not actuated, the measurement voltage of the first temperature sensor is applied to the analog signal input of the control device, with the result that the control device can evaluate the measurement voltage as a temperature signal and can influence the ignition device in accordance with the reported temperatures. As long as the short circuit button is not actuated, the temperature signal is applied to the analog signal input of the control device.

In order to switch off the combustion engine, the user actuates the short circuit button. With the actuation of the short circuit button, the measurement voltage at the resistance of the first temperature sensor collapses. As a result of the actuation of the short circuit button, the measurement voltage at the resistance tends to "zero" volts. The control device registers the collapse of the measurement voltage, for example the fall of the edge. The control device registers, for example, the fall of the temperature signal to "zero". With a corresponding signal input, the control device can detect that the short circuit button has been actuated. The control device can accordingly control the ignition device and can switch it off, in particular by interrupting ignition. The combustion engine stops.

In an embodiment, the short circuit button is in the form of a normally open contact and is arranged electrically in parallel with the first temperature sensor. The ohmic resistance of the temperature sensor is greater, in particular several times greater, than the ohmic resistance of the short circuit button closed in the button position in a predefined temperature range. This ensures that the actuation of the short circuit button is detected by the control device in a functionally reliable manner. If the short circuit button is actuated, a considerably lower ohmic load is present at the analog signal input than in the case of an open short circuit button, as a result of which the actuation of the short circuit button is easily detected.

In an embodiment, the short circuit button may be in the form of a normally closed contact. The short circuit button is electrically in series with the first temperature sensor, wherein the series circuit is open in the button position of the short circuit button. With actuation of the short circuit button in the form of a normally closed contact, the resistance present at the analog signal input becomes very large, in particular infinite, when the series circuit is open. When the series circuit is open, this resistance is several times greater, in particular significantly greater, than the ohmic resistance of the closed series circuit having the first temperature sensor.

The control device advantageously can include a microprocessor which ensures that the electrical states at the analog signal input are reliably detected.

In an embodiment, the short circuit button is connected to the signal input via two signal lines. The ground connection is provided at the control device, in particular. The two signal lines can preferably be separately laid individual conductors, but may also be in the form of a connecting line having a common sheath.

The short circuit button and the first temperature sensor can preferably be arranged in a common housing, in particular in a common encapsulated housing. This facilitates the installation of the short circuit button and the first temperature sensor in a work apparatus. The encapsulated housing protects the short circuit button and the first temperature sensor from contamination.

The housing can preferably have a common connecting line for the short circuit button and the first temperature sensor. As a result of the common connecting line, the cabling between the encapsulated housing arranged at a first location in the work apparatus and the control device arranged at a second location in the work apparatus is easily possible.

The short circuit button can advantageously be in the form of a microswitch which ensures a stable operating position of the normally closed contact or normally open contact after carrying out a minimum travel path.

In an embodiment, the combustion engine is held in the housing of the work apparatus with anti-vibration elements. The first temperature sensor is arranged on the vibration-decoupled side of the housing and captures, in particular, the ambient temperature of the work apparatus. The first temperature sensor can advantageously be formed in a common housing with the stop button. The housing of the first temperature sensor can particularly advantageously be on the outer side of the motor housing of a work apparatus. As a result of the spatially remote arrangement of the first temperature sensor from the combustion engine, the first temperature sensor can capture the ambient temperature virtually independently of the temperature of the combustion engine before and/or during operation of the combustion engine.

In an embodiment, the engine temperature can be captured via a further temperature sensor and the ambient temperature can be captured via the first temperature sensor. As a result, a warm combustion engine can be distinguished from a cold combustion engine in the case of different ambient temperatures. Detection of the temperature of the combustion engine makes it possible to accurately meter the fuel under different boundary conditions in handheld work apparatuses having electronically controlled fuel supply, for example for a cold start in a warm environment or for a warm start in a cold environment. The necessary attempts to start the combustion engine until it starts up can thus be reduced. The combustion engine can advantageously be started using a manual starting device such as a pull starter or a spring starter, for example.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
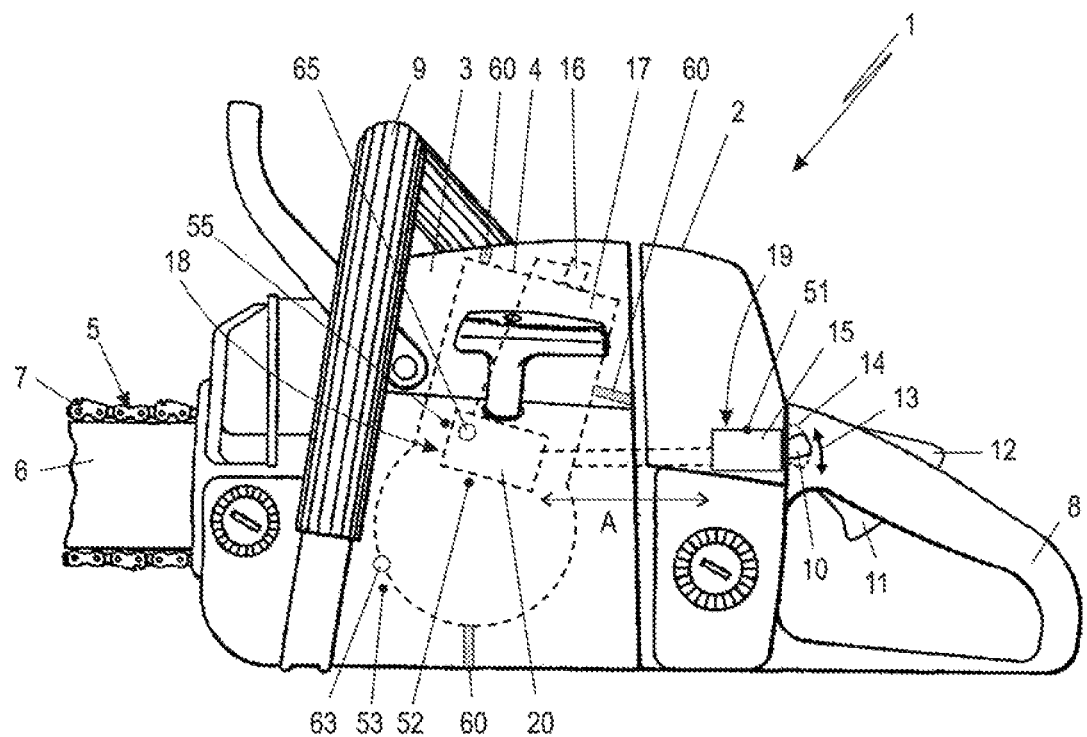
FIG. 1 shows a schematic view of a handheld work apparatus having a spark-ignition combustion engine.

The work apparatus 1 shown in FIG. 1 is a handheld work apparatus which is in the form of a chain saw 2 in the embodiment shown. Other work apparatuses may be angle grinders, brush cutters, hedge trimmers or similar work apparatuses.

The work apparatus 1 has a motor housing 3 with a spark-ignition combustion engine 4 arranged therein. The combustion engine 4 is used as a drive for a work tool 5 which, in the embodiment shown, is provided as a saw chain 7 circulating on a guide bar 6.

The motor housing 3 of the handheld work apparatus 1 includes a rear handle 8 and a front handle 9 forming a bow-type handle. The work apparatus 1 is held and guided by a user via the handles 8 and 9.

The combustion engine 4 arranged in the motor housing 3 is held in the motor housing 3 via anti-vibration elements 60, in particular. The handles 8, 9, in particular, are arranged on the vibration-decoupled housing side of the work apparatus 1.

The rear handle 8 has a throttle lever 11 and a throttle lever lock 12 assigned to the throttle lever 11. An operator-controlled lever 10 is arranged in the front region of the handle 8 in which the throttle lever 11 and the throttle lever lock 12 are provided, preferably in the motor housing 3 of the work apparatus 1. The operator-controlled lever 10 can be pivoted in the direction of the double arrow 13 in order to assume different operating positions. The central position shown corresponds to the operating position in which the combustion engine 4 is operating and can be controlled using the throttle lever 11. The lower position depicted using dashed lines corresponds to a starting position for starting the combustion engine 4, in particular for cold-starting the combustion engine 4. The upper, dotted position of the operator-controlled lever 10 is a button position 14 in which the short circuit button 15 is actuated.

The spark-ignition combustion engine 4 has a spark plug 16 which ignites a fuel/air mixture drawn into a combustion chamber 17 of the combustion engine 4. An ignition device 18 is provided for the purpose of controlling the spark plug 16. As shown in the embodiment, the ignition device 18 may include an electronic control device 20.

The short circuit button 15 is connected to an analog signal input 21 of the control device 20. The short circuit button 15 can preferably be connected to the first signal input 21 via a first signal line 22a and is connected to the second signal input 23 of the control device 20 via a further, second signal line 22b. The second signal input 23 may have a reference potential such as ground. The second signal input 23 can preferably be a ground connection. Alternatively, as schematically shown in FIG. 1, the short circuit button 15 can also be connected to the combustion engine 4 as ground potential using a connection. The signal lines 22a and 22b may expediently form a common connecting line 24. Both signal lines 22a and 22b can preferably be in a common outer sheath in the common connecting line 24.

Figure 2:
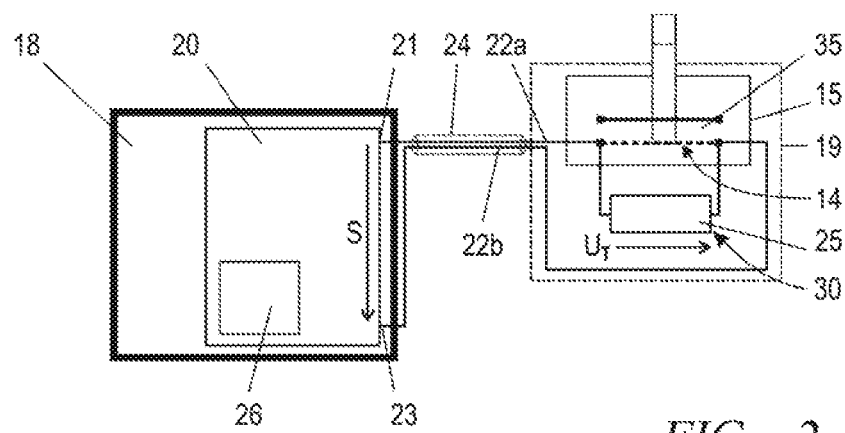
FIG. 2 shows a schematic illustration of a control device having a connected short circuit button and a temperature sensor.
Figure 4:
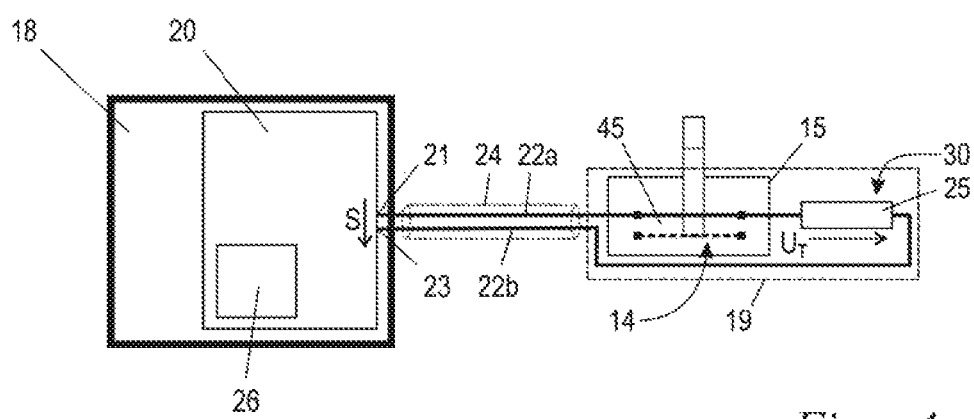

The short circuit button 15 is arranged, together with the first temperature sensor 30, in a housing 19, as shown in FIGS. 1, 2 and 4, for example. The housing 19 may preferably be a common housing, in particular an encapsulated housing. In particular, the housing 19 is an encapsulated and shielded housing 19. The encapsulated housing 19 can advantageously protect the contact of the short circuit button 15 and/or the first temperature sensor 30 from dirt and moisture.

The housing 19 is provided at a first location 51 (FIG. 1) in the motor housing 3 of the work apparatus 1. The ignition device 18 including the electronic control device 20 is provided at a second location 52 (FIG. 1) in the motor housing 3 of the work apparatus 1. The first location 51 is at a distance A away from the second location 52. The signal lines 22a and 22b advantageously in the form of a two-wire line connect the short circuit button 15 arranged in the housing 19 to the control device 20. A connecting line 24 in the form of a connecting cable, as represented using dots in FIG. 2 by way of example, can advantageously be provided for the purpose of connecting the short circuit button 15 arranged in the motor housing 3 of the work apparatus 1 to the control device 20.

The work apparatus 1 can advantageously have third locations 53 and fourth locations 55. The third and fourth locations 53, 55 are in different cooling zones of the combustion engine 4. In this context, regions of the work apparatus 1 which are cooled in a different manner, for example via passive cooling and/or via active cooling, are referred to as cooling zones. The cooling zones can advantageously be separated from one another, preferably completely separated from one another, via structural measures, for example via bulkheads or the like. The local position of the first temperature sensor 30 in the work apparatus 1 differs from the third and fourth locations 53, 55 at which further temperature sensors, for example a second temperature sensor 63 and a third temperature sensor 65, can be arranged. In a particular configuration, the temperature sensors 30, 63, 65 are arranged in different cooling zones of the work apparatus 1. The control device 20 is configured in such a manner that it can carry out consistent control operations by linking the captured temperatures at the different locations 51, 53, 55 of the different cooling zones. For example, the controller 20 can control an electronically controlled fuel supply in a manner adapted to the temperature, in particular for starting the combustion engine.

According to the embodiment in FIG. 1, three temperature sensors 30, 63, 65 are provided in the work apparatus 1. The second temperature sensor 63 can advantageously be in the form of a combined pressure/temperature sensor and captures the engine temperature at the crankcase of the combustion engine 4. The third temperature sensor 65 can advantageously be arranged on the circuit board of the control device 20 and is used to monitor the temperature in the control device 20. The first temperature sensor 30 connected via the signal lines 22a and 22b of the short circuit button 15 is used to record the ambient temperature and can advantageously be the furthest away from the combustion engine 4. The signals from the temperature sensors 30, 63, 65 are not compared with one another. The signal from the second temperature sensor 63 at the crankcase and the signal from the first temperature sensor 30 for capturing the ambient temperature may advantageously be used to control the amount of fuel supplied to a carburation device of the combustion engine 4, in particular to appropriately control the amount of fuel when starting the combustion engine 4.

If, for example, the first temperature sensor 30 for the ambient temperature and the second temperature sensor 63 at the combustion engine 4 indicate a low temperature of 5° to 15°, for example, an increased amount of fuel is supplied during starting. If, for example, the first temperature sensor 30 for the ambient temperature and the second temperature sensor 63 at the combustion engine 4 indicate different temperatures, for example if the temperature of the combustion engine 4 is 50°, for example, and is therefore higher than an ambient temperature of 20°, for example, a medium amount of fuel is supplied. If, for example, the first temperature sensor 30 for the ambient temperature and the second temperature sensor 63 at the combustion engine 4 indicate identical warm temperatures of 25°, for example, a small amount of fuel is supplied.

In the embodiment according to FIG. 2, the short circuit button 15 is in the form of a normally open contact 35. An ohmic resistance 25 is connected in parallel with the normally open contact 35, the resistance value of which ohmic resistance changes on the basis of the temperature. The ohmic resistance 25 which is variable on the basis of the temperature and can preferably be in the form of a PTC (positive temperature coefficient) resistance, forms a first temperature sensor 30. The PTC resistance 25 can preferably be connected to a DC source of the control device 20, in particular, via the signal inputs 21, 23, as a result of which a measurement voltage $U_T$ is established in a manner proportional to the size of the resistance 25. The measurement voltage $U_T$ dropped across the resistance 25 of the first temperature sensor 30 is applied, as an analog temperature signal S, between the analog first signal input 21 and the second signal input 23 of the control device 20. In this case, the electrical configuration is such that the ohmic resistance 25 of the first temperature sensor 30 is greater than the ohmic resistance of the short circuit button 15 closed in the button position 14 in a predefined temperature range.

The combustion engine 4 runs during operation of the work apparatus 1. The normally open contact 35 of the short circuit button 15 is open, as shown in FIG. 2. The measurement voltage $U_T$ dropped across the resistance 25 will be applied, as an analog temperature signal S, between the signal inputs 21 and 23 of the control device 20 when the normally open contact 35 is open. The control device 20 can evaluate the temperature signal S and can use the determined temperature as an operating parameter for operating the combustion engine 4. A microprocessor 26 may preferably be provided in the control device 20 for the purpose of processing the signals applied to the analog signal inputs 21 and 23.

If the user wishes to switch off the work apparatus 1, he will change the operator-controlled lever 10 into the dotted button position 14 in which the normally open contact 35 of the short circuit button 15 is closed, as shown using dashed lines in FIG. 2. When the short circuit button 15 is closed, the ohmic resistance 25 of the temperature sensor 30 is short-circuited. The measurement voltage $U_T$ across the resistance 25 collapses. The measurement voltage $U_T$ is very small, in particular "zero" volts.

The temperature signal S applied to the analog signal inputs 21 and 23 of the control device 20 likewise collapses. The first analog signal input 21 and the second analog signal input 23 are short-circuited. This is determined by the control device 20 and the ignition device 18 is switched off. There is no further control of the spark plug 16 and the combustion engine 4 stops.

In order to detect a unique state at the analog signal inputs 21 and 23 of the control device 20 in a functionally reliable manner in each case, provision is made for the ohmic resistance 25 of the first temperature sensor 30 to be greater, in particular significantly greater, than the ohmic resistance of the short circuit button 15 closed in the button position 14 in a predefined temperature range. The ohmic resistance of the first temperature sensor 30 can therefore be in the range of megohms and the ohmic resistance of the short circuit button 15 closed in the button position 14 can be in the range of ohms or milliohms.

Figure 3:
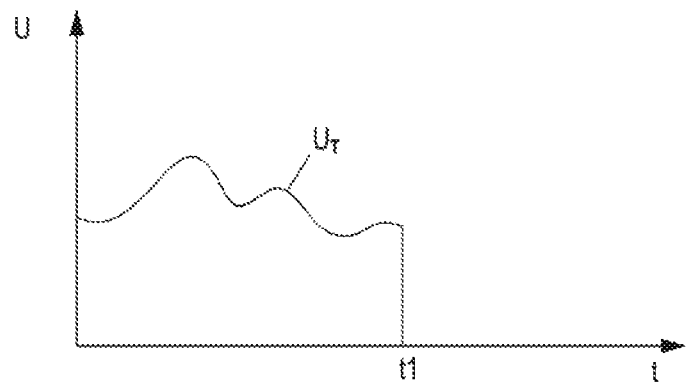
FIG. 3 shows a schematic illustration of an analog temperature signal applied to the analog signal input of the control device; and, FIG. 4 shows a schematic illustration of a control device according to FIG. 2 with a series circuit including a short circuit button and a temperature sensor.

If the short circuit button 15 is open, as shown by the solid line in FIG. 2, the measurement voltage $U_T$ is applied, as a temperature signal S, between the analog signal inputs 21 and 23 of the control device 20. This is schematically represented in the graph in FIG. 3. If the short circuit button 15 is actuated at the time t1, that is, the normally open contact 35 is changed to its button position 14 shown using dashed lines in FIG. 2, the ohmic resistance 25 of the first temperature sensor 30 is short-circuited. When the ohmic resistance 25 is short-circuited, the measurement voltage $U_T$ collapses after the time t1. The measurement voltage $U_T$ then tends to "zero" volts or is "zero".

The alternative circuit arrangement schematically represented in FIG. 4 corresponds, in terms of the basic structure, to the circuit arrangement according to FIG. 2. However, in the embodiment according to FIG. 4, the short circuit button 15 is in the form of a normally closed contact 45. The same reference signs in FIG. 4 denote the same parts as in preceding embodiments. The short circuit button 15 is in series with the resistance 25 of the first temperature sensor 30. If the short circuit button 15 in the form of a normally closed contact 45 is in its position of rest, as shown by the solid line in FIG. 4, the first temperature sensor 30 in the form of an ohmic resistance 25 is present at the analog signal inputs 21 and 23 of the control device 20. The control device 20 evaluates the measurement voltage $U_T$ dropped across the resistance 25 as a temperature signal S and accordingly controls the ignition device 18.

If the short circuit button 15 is pressed in the circuit arrangement according to FIG. 4 in order to switch off the combustion engine 4, the series circuit present at the analog first signal inputs 21 and second signal inputs 23 is interrupted.

If the user wishes to switch off the combustion engine 4, the short circuit button 15 is pressed, as a result of which the normally closed contact 45 is moved into the dashed open position. The series circuit present at the analog signal inputs 21 and 23 is interrupted. On account of the open electrical circuit, the measurement voltage $U_T$ across the resistance 25 collapses. The temperature signal S at the analog signal input 21, 23 of the control device 20 becomes "zero". The control device 20 detects the open signal input 21, 23 and prevents further ignition sparks at the spark plug 16. The combustion engine 4 stops.

FIGS. 2 and 4 schematically show the short circuit button 15 in the form of a microswitch. Both the microswitch as the short circuit button 15 and the first temperature sensor 30 can advantageously be integrated in the housing 19. The first temperature sensor 30 can preferably be integrated in the housing of the microswitch. The microswitch can then be connected to the control device 20 via a common connecting line 24.

The microswitch of the short circuit button 15 can advantageously be molded with the resistance 25 of the first temperature sensor 30 that is in the form of a PTC, in particular, which ensures low susceptibility to contamination.

It is understood that the foregoing description is that of the preferred embodiments of the invention and that various changes and modifications may be made thereto without departing from the spirit and scope of the invention as defined in the appended claims.

What is claimed is:

1. A handheld work apparatus comprising:
a motor housing;
a spark-ignition combustion engine arranged in said motor housing;
a spark plug;
an ignition device for controlling said spark plug;
said ignition device including an electronic control device;
a short circuit button with a button position for switching off said combustion engine;
a first temperature sensor for capturing an operating temperature;
said control device having a common signal input;
a common signal line;
said short circuit button and said first temperature sensor being connected to said common signal input of said control device via said common signal line;
said first temperature sensor including an ohmic resistance which is variable on the basis of temperature;
a measurement voltage ($U_T$) dropped across said ohmic resistance of said first temperature sensor being supplied, as an analog temperature signal (S), to a common analog signal input of said control device; and,
wherein said measurement voltage ($U_T$) at said first temperature sensor collapses in said button position of said short circuit button and said analog temperature signal (S) is extinguished.

2. The work apparatus of claim 1, wherein:
said ohmic resistance of said first temperature sensor is a first ohmic resistance;
said short circuit button is in the form of a normally open contact and is in parallel with said first temperature sensor;
said first ohmic resistance of said first temperature sensor is greater than a second ohmic resistance of said short circuit button closed in said button position in a predefined temperature range.

3. The work apparatus of claim 1, wherein said short circuit button is in the form of a normally closed contact and is open in said button position, and said short circuit button is in series with said first temperature sensor.

4. The work apparatus of claim 1, wherein said control device includes a microprocessor.

5. The work apparatus of claim 1, wherein said short circuit button is connected to said signal input of said control device via two signal lines.

6. The work apparatus of claim 1 further comprising:
an encapsulated housing;
said short circuit button and said first temperature sensor being arranged in said encapsulated housing.

7. The work apparatus of claim 1, further comprising an encapsulated housing having a common connecting line for said short circuit button and said first temperature sensor.

8. The work apparatus of claim 1, wherein said short circuit button is a microswitch.

9. The work apparatus of claim 1 further comprising:
a plurality of anti-vibration elements;
said combustion engine being held in said motor housing of the work apparatus with said anti-vibration elements; and,
said first temperature sensor being arranged on a vibration-decoupled side of said motor housing.

10. The work apparatus of claim 1, wherein said first temperature sensor is configured to capture an ambient temperature of the work apparatus.

* * * * *